United States Patent [19]

Makarainen

[11] 3,999,431
[45] Dec. 28, 1976

[54] PRESSURE MONITOR

[76] Inventor: Kauko E. Makarainen, 1366 Rosal Lane, Concord, Calif. 94521

[22] Filed: Feb. 23, 1976

[21] Appl. No.: 660,455

[52] U.S. Cl. .......................... 73/146.5; 73/398 R; 73/419; 340/58; 200/82 D

[51] Int. Cl.² .................. B60C 23/04; G01L 7/16; G01L 9/00

[58] Field of Search ............ 73/146.5, 419, 398 R; 200/82 R, 82 A, 82 B, 82 C, 82 D; 340/58

[56] References Cited

UNITED STATES PATENTS 2,669,876  2/1954  Lentz ............................ 73/146.5
3,296,590  1/1967  Dalton ........................... 200/82 D Primary Examiner—Donald O. Woodiel
Attorney, Agent, or Firm—Bielen and Peterson

[57] ABSTRACT

A pressure monitor for an enclosed body possessing an internal pressure differential utilizing a chamber having a piston disposed for travel therewithin. The piston includes a transversely mounted electrical conductor which forms an electrical bridge with a pair of contacts disposed on either side of the piston. A monitor means electrically connects between the pair of contacts to indicate the internal pressure of the enclosed body.

10 Claims, 5 Drawing Figures

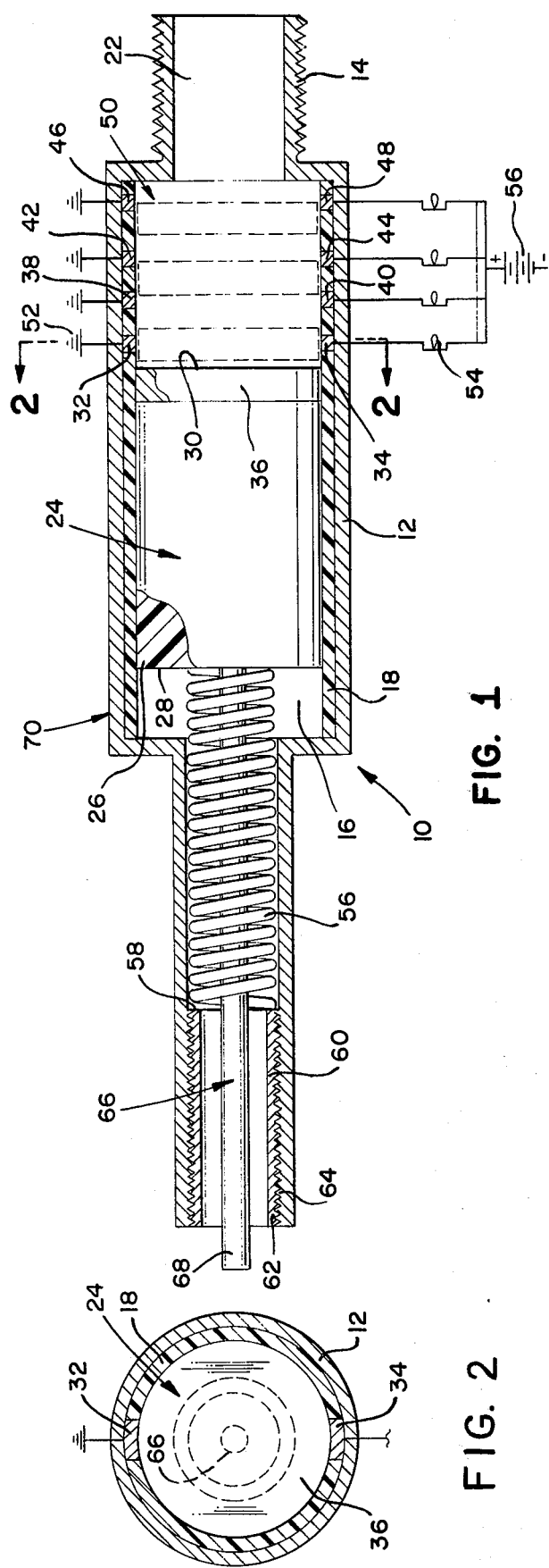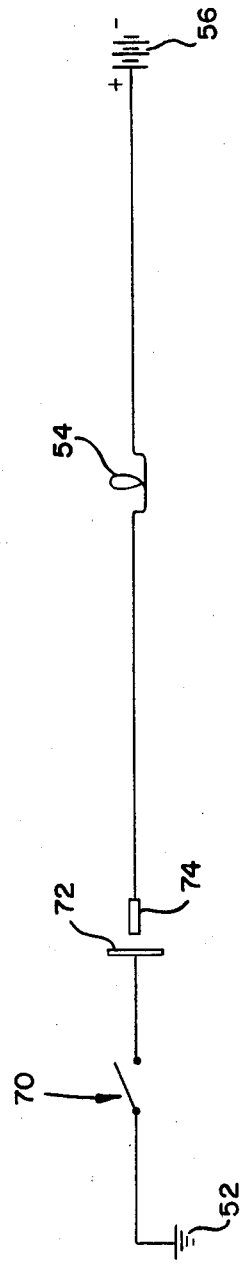

PRESSURE MONITOR

BACKGROUND OF THE INVENTION

The present invention relates to a novel pressure monitor and alarm for enclosed pressure or vacuum bodies.

Pressure gages for the measurement of liquids and gases have been applied to many situations where such knowledge is needed. For example, pressure gages have been available to measure the pressure differential between the atmosphere and pressure vessels containing fluids such as air, steam, water and similar materials. The known prior art includes vacuum gages, barometers, manometers, dead-weight piston gages, Bourdon tubes among others.

A problem exists when the pressure measurement must be communicated to an area remote from the user. This has been accomplished in the past by converting the pressure indication into an analogue quantity, for example, a voltage potential, air pressure and the like. One such instrument is the strain gage having varying electrical resistance attached to the surface of a hollow cylinder exposed to the pressure source. The output of this device must be linearized over the range of voltage selected to produce consistant results. Also, the hollow cylinder must be uniformly cast to produce predictable resistance patterns.

A further problem is encountered when the pressure must be remotely indicated in an enclosed body that rotates, such as tires for airplanes, automobiles, trucks, campers, and other vehicles. Further difficulties ensue in the calibration and testing remote pressure sensors in vehicles subject to jarring forces and the general wear and tear associated with motion. Often, alarms and control mechanisms append to pressure sensors. Such devices must be amenable to these necessary modication.

SUMMARY OF THE INVENTION

In accordance with the present invention a novel pressure monitor is provided.

The monitor utilizes a chamber which communicates with an enclosed body having an internal pressure differential with respect to the external environment. The chamber includes dielectric walls. A piston disposed for travel within said chamber possesses a dielectric periphery which seemingly engages the dielectric walls of the chamber.

The piston further includes an electrical conductor that spans the periphery of the piston. The conductor forms an electrical bridge across the chamber when it touches a pair of spaced electrical contacts, located on the periphery of the piston.

A monitor means for indicating establishment of the electrical bridge serves to inform the user of the position of the piston within the chamber and therefore the pressure of the vessel or enclosed body.

The piston may resist the pressure exerted by the enclosed body by its own weight. Also, a spring means may bias the piston against the pressure or vacuum of the enclosed body rendering the monitor independent of gravitational pull.

The device may further include a plunger means for causing the piston to travel within the chamber thus forming the electrical bridge of the chamber. The user may test the workability of the monitor means, by pressing the plunger portion exterior to the chamber.

Likewise, the spring means may entail a spring disposed between the plunger and a threaded member which treadingly engages the chamber. The threaded member, being distance adjustble with respect to the enclosed body, loosens or tightens the sring pressure by its action.

The invention may take the form of a plurality of space pairs of contacts spaced along the chamber wall to indicate levels of pressure within the enclosed body as the piston travels within the chamber.

When the monitor is placed in a rotatable body the monitor would additionally have an electrically conductive rotor which rotates with the enclosed body. The contacts connect to a ground, and a power source and to the rotor. An electrically conductive brush rides on the rotor and connects to an indicator means for showing the establishment of the electrical bridges. Thus, the monitor permits remote sensing of a rotating pressure body from a non-rotating body.

It is therefore an object of the present invention to provide a pressure monitor to sense positive and negative pressures within an enclosed body.

It is another object of the present invention to provide reliable remote sensing of the pressure in a pressure vessel by utilizing an electrical analogue.

It is yet another object of the present invention to provide an easily calibrated and tested pressure monitor of rugged construction for use with mobile vessels.

A further object of the present invention is to provide a presure monitor for mobile vehicle tires which easily installs in a tube or tubeless tire without disruption of the balance of the tires.

The invention possess other objects and advantages expecially as concerns particular features and characteristics thereof which will become apparent as the specification continues.

BRIEF DESCRIPTION OF THE DRAWINGS

FIG. 1 is an axial sectional view of the pressure monitor.

FIG. 2 is a sectional view taken along line 2—2 of FIG. 1.

FIG. 5 is a simplified schematic of the pressure monitor system.

DESCRIPTION OF THE PREFERRED EMBODIMENTS

Figure 3:
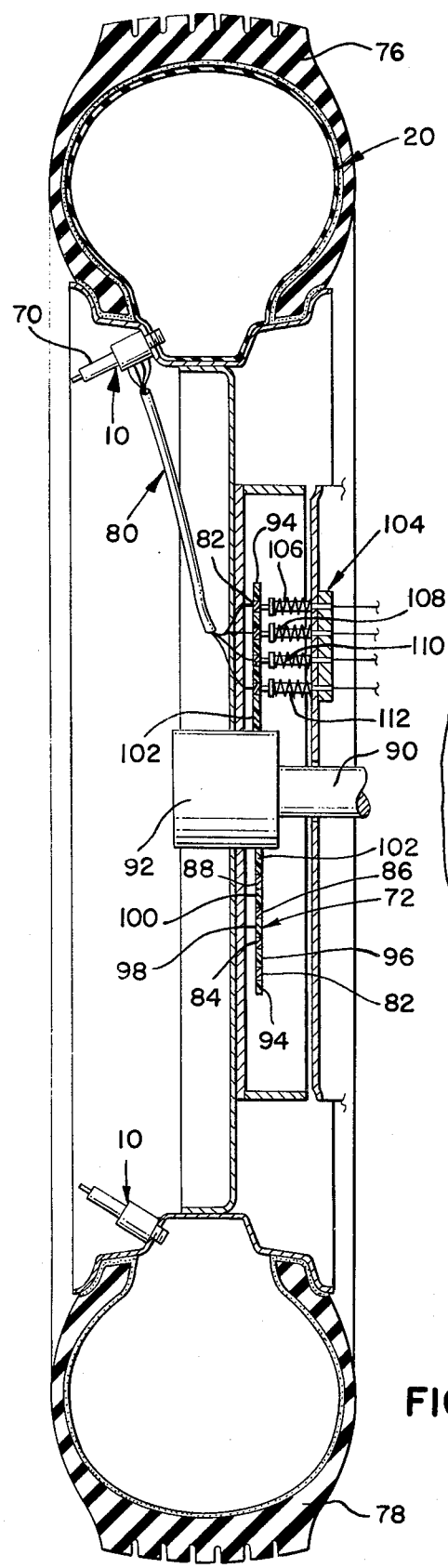
FIG. 3 is a sectional view of the pressure monitor in place in a pneumatic tire.
Figure 4:
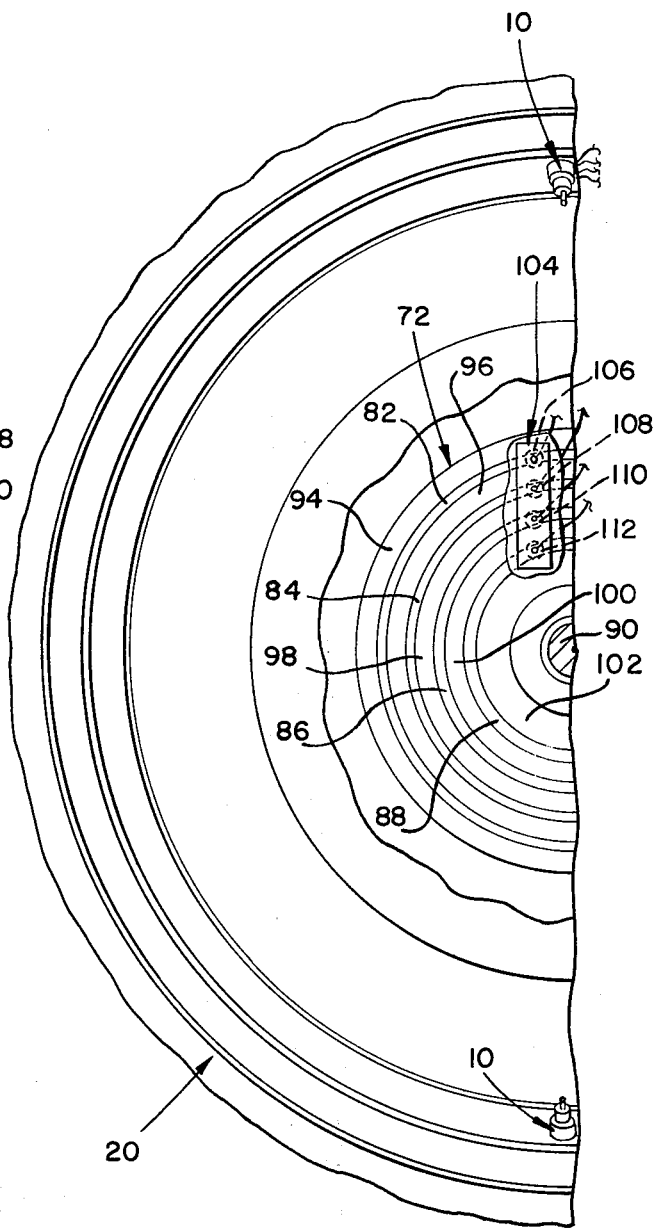
FIG. 4 is a broken side view of the rotor within the pneumatic tire.

The device as a whole is depicted by the reference character 10, FIG. 1 and includes a body 12 constructed of material capable of containing an internal negative or positive pressure. The body 12 has a threaded portion 14 on the exterior of one of its extremities, for mounting purposes, the details of which will be fully described as the specification continues.

The body encloses a chamber 16 having walls 18 of dielectric material such as ceramic, teflon, nylon and the like. The chamber communicates with an enclosed body 20 having a pressure differential with respect to the external environment via opening 22, FIGS. 1 and 3.

The chamber contains a piston 24 having a dielectric periphery 26 which sealingly engages the dielectric walls 18 of chamber 16. The piston 24 travels within chamber 16 in a direction dependent on the forces applied to either end 28 or end 30, thereof. The piston and chamber may be of any crossectional configuration such as circular, square, oblong, trapezoidal and other polygonal and curvilinear shapes. The body of the piston 24 requires a generally rigid characteristic for preferred smooth travel within chamber 16, FIGS. 1 and 2.

The device includes a pair of spaced contacts 32 and 34 as well as an electrical conductor 36 spanning the periphery of the piston 24. When piston 24 positions such that conductor 36 and contacts 34 and 36 align, an electrical bridge forms across the chamber 16. The contacts 32 and 34 may be located in the walls of chamber 16. A plurality of pairs of contacts 32 and 34, 38 and 40, 42 and 44, and 46 and 48 may locate in spaced relationship along chamber walls 18 to form a plurality of electrical bridges with conductor 36. FIG. 1 depicts the various positions of conductor 36 in phantom. It should be noted that conductor 36 may be formed of sufficient width to contact two adjacent pairs of contacts simultaneously.

Monitor means 50 for indicating establishment of an electrical bridge or bridges across chamber 16, electrically connects between each pair of contacts eg; 32 and 34. For instance, contact 32 may connect to ground 52 and contact 34 may connect to warning light 54, activated by power source 56. For consistency and clarity, each electrical ground shown on the drawings, is common ground 52 motivated by a single power source 56. Warning light 54 typifies other warning lights connected in series with contacts 38 and 40, 42 and 44, and 46 and 48. Of course, other alarms appealing to the other senses may be employed in substitution for warning light 54, such as buzzers, bells, electrical shocks and the like, as is well known in the art.

The monitor 10 also includes adjustable means 56 for biasing the piston 24 against or in opposition to the pressure exerted by enclosed body 20, the pressure of enclosed body may be negative (vacuum) or positive. In the case of a positive pressure, the pressurizing medium may be of any state, solid liquid, or vapor. As depicted in the preferred embodiment the pressure of body 20 is positive. Spring means 56 pushes against piston end 28. The other end of spring means 56 bears on shoulder 58 of threaded collar 60, threaded portion 62 of collar 60 threadingly engages internally threaded portion 64 of body 12. Thus, the spring pressure of spring means 56 against piston 24 may be increased or decreased by the threading and unthreading of collar 60, which is distance adjustable with respect to body 20.

The piston 24 includes a plunger 66 with end portion 68 accessible to the external environment with respect to chamber 16 and enclosed body 20. Manual pressing of plunger 66 effects the establishment of an electrical bridge between contacts 32 and 34 with conductor 36.

FIG. 5 illustrates schematically the general usage of monitor switch within a rotatable body, which has been shown in the drawings as a pneumatic tire by way of example. Ground 52 connects in series with switch 70, shown as a single contact switch, which is intended to embody the switch above described in FIGS. 1 and 2. A rotor 72 contacts brush 74 which connects in series with warning light 54 and power source 56.

FIG. 3 shows the installation of pressure monitor 10 within tube and tubeless pneumatic tires 76 and 78; a single tire has been fabricated into both types for the purpose of explanation. Tire 76 includes a pressure monitor 10 which would also include the elements of the pressure monitor 10 of tire 78. Turning to tire 76, the switch 70 includes a plurality of electrical conductors 80, leading from contacts 34, 40, 44, and 48, FIG. 1. The conductors 80 connect to rotor 72, which features conductor bands 82, 84, 86 and 88 disposed in concentric fashion about axle 90 having bearing 92. Interposed and alternating the conductor bands 82 are electrical insulating bands 94, 96, 98, 100 and 102. Brush block 104 includes a multiplicity of brushes 106, 108, 110 and 112 which carry on electrical signal to warning lights exemplified by light 54.

In operation, the switch 70 installs such that piston 24 confronts pressure exerted by enclosed body 20 and the warning light 54 may readily be seen by a person or mechanism designed to take corrective action. In the present embodiment as the positive pressure of body decreases, the conductor 26 will form an electrical bridge with contacts 32 and 34. The bridge formation completes the circuit between the power source 56, warning light 54, and ground 52. In the case of a axially rotating body the circuit would additionally include the rotor 72 and brush 74. The decrease in pressure in body 20 would set off warning light 54 or other corrective mechanisms.

When device 10 includes pairs of contacts 38 and 40, 42 and 44, and 46 and 48, the warning lights thereconnected would indicate the degree of pressure drop; coupled with a time lapse for such a drop in pressure would indicate the rate of pressure drop. Numerical values could be assigned to each warning light if desired. It should be noted that the conductor 36 may be sized to contact two pairs of contacts at the same time, as previously discussed. This feature would allow estimates of pressure values for body 20 between the values assigned the warning lights. As shown in phantom the conductor 36 may contact pairs of contacts 38 and 40, and 42 and 44.

The spring means 56 may be adjusted for correct value by the threading or unthreading of collar 60, while comparing the pressure of body 20 shown by an independent measuring source. The plunger 66 offers a quick check of the workability of the device, by forcing the formation of electrical bridges between the conductor 36 and the contact.

The device 10 switch portion 70 may be inserted into valve stem of a tube tire 76. To install monitor 10 in a tubeless tire 78 the switch 70 may install opposite to the valve stem, which offers the advantage of balanced operation.

It will be surmised that the device 10 may be employed on any pressured body and, expecially useful on pneumatic tires found on aircraft, automobiles, and buses, where the integrity of pueumatic tires is essential to safe movement of the vehicle. Reliability and low maintenance costs add to the desirability of the device becuase of its economy of design.

While in the foregoing specification embodiment of the invention have been set forth in considerable detail for purposes of making a complete disclosure of the invention, it will be apparent to those skilled in the art that numerous changes may be made in such details without departing from the spirit and principles of the invention.

What is claimed is:

1. A pressure monitor for an enclosed body having an internal pressure differential with respect to the external environment comprising:
    a. chamber communicating with the enclosed body, having dielectric walls, b. piston disposed for travel within said chamber said piston having a dielectric periphery which sealingly engages said dielectric walls of said chamber, said piston, including an electrical conductor spanning the periphery of said piston, c. a pair of spaced electrical contacts disposed in the walls of said chamber, said contacts and said electrical conductor providing and electrical bridge across said chamber, d. Monitor means for indicating establishment of said electrical bridge, said monitor means electrically connected between said pair of contacts.

2. The pressure monitor of claim 1 which additionally comprises adjustable spring means for biasing said piston against the pressure exerted by the enclosed body.

3. The pressure monitor of claim 2 which additionally comprises plunger means for causing said piston to travel within said chamber, said plunger means having an accessible portion exterior to said chamber.

4. The pressure monitor of claim 3 in which said adjustable spring means includes a spring within a portion of said chamber, said spring having a first end portion and a second end portion, said first end portion bearing on said piston and said second end portion bearing on a threaded member, threadingly engaging said chamber, said threaded member being distance adjustable with respect to the enclosed body.

5. The pressure monitor of claim 4 in which said contact pair comprises a plurality of said contact pairs, spaced along the chamber walls selectively forming a plurality of said electrical bridges when said piston travels within said chamber, and said monitor means selectively indicates establishment of said electrical bridges.

6. The pressure monitor of claim 1 in which said monitor mounts within an enclosed body which rotates about an axis and said monitor means additionally comprises:

a. an electrically conductive rotor disposed about the axis of the rotating enclosed body and axially rotating with the rotating enclosed body, one of said pair of contacts electrically connected to said rotor, the other of said pair of contacts connected to ground.

b. brush electrically contacting said rotor.

c. indicator means for indicating establishment of said electrical bridge, said indicator means electrically connected to said brush.

d. power source for a circuit formed by said electrical bridge, rotor, brush and indicator means.

7. The pressure monitor of claim 6, which additionally comprises adjustable spring means for biasing said piston against the pressure exerted by the enclosed body.

8. The pressure monitor of claim 7 which additionally comprises plunger means for causing said piston to travel within said chamber, said plunger means having an accessible portion exterior to said chamber.

9. The pressure monitor of claim 8 in which said adjustable spring means includes a spring within a portion of said chamber, said spring having a first end portion and a second end portion, said first end portion bearing on said piston and said second end portion bearing on a threaded member, threadingly engaging said chamber, said threaded member being distance adjustable with respect to the enclosed body.

10. The pressure monitor of claim 9 which said contact pair comprises a plurality of said contact pairs, spaced along the chamber wall selectively forming a plurality of said electrical bridges when said piston travels within said chamber, and said monitor means selectively indicates establishment of said electrical bridges.

* * * * *